Oct. 8, 1946.   T. CLARK ET AL   2,408,914
PRESSURE LUBRICATION SYSTEM
Filed Oct. 25, 1943
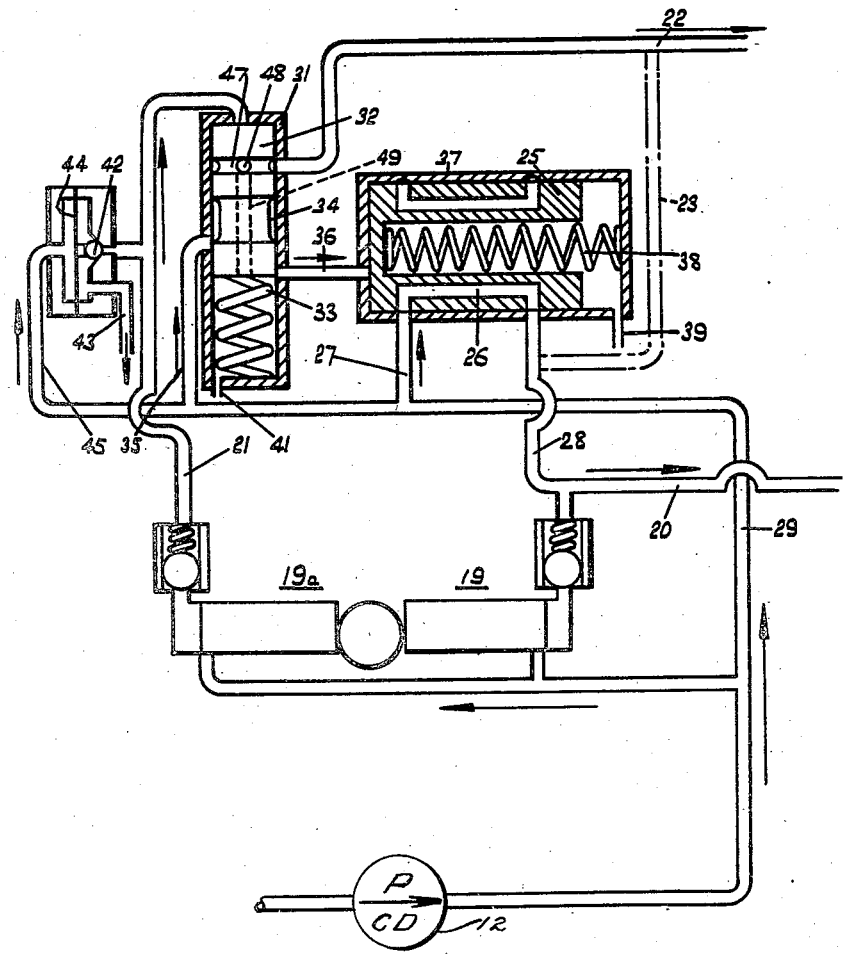
Inventors
Thomas Clark
Edward Victor Windsor
and Laurence Hart
by Mawhinney & Mawhinney
Attorneys Patented Oct. 8, 1946

2,408,914

UNITED STATES PATENT OFFICE 2,408,914

PRESSURE LUBRICATION SYSTEM

Thomas Clark, Edward Victor Windsor, and Laurence Hart, Coventry, England, assignors to Armstrong Siddeley Motors Limited, Coventry, England Application October 25, 1943, Serial No. 507,560
In Great Britain September 17, 1943

6 Claims. (Cl. 184—6)

1

This invention relates to pressure lubrication systems for bearings or other points which require to be lubricated.

Our main object is to provide means which will ensure exact lubrication, independently of varying temperatures, when running conditions are reached, and which will also ensure sufficient lubrication when starting up.

For an understanding of this and other objects and advantages of the invention attention should be paid to the following description in which reference is made to the accompanying drawing.

As there shown, and later described in greater detail, the lubrication system of the invention includes a main constant-pressure pump, of which there are many known kinds, delivering to a point to be lubricated through a metering pump, and means by which the metering pump is by-passed when starting up, the by-pass being automatically closed, so that the point will receive only the metered delivery, after a predetermined time-lag. Preferably the by-pass is closed by means of a control valve, which is acted upon by the delivery from the main pump, on the operation of a servo valve which is acted upon by the delivery from another metering pump supplied from the main pump, the period of operation of the servo valve determining the time-lag aforesaid. To guard against a failure in the action of the servo valve once running conditions have been reached, we may arrange for the control valve to be held in the actuated position (when it has been actuated) by having the delivery of the main pump applied to an appropriate part of it. Conveniently, the control and servo valves are biassed as by springs to return to their original positions, and means provided to release the pressure applied to the servo valve when the delivery of the main pump ceases—i. e., when the apparatus is shutting down. Such means may include a leak-off valve which is arranged to be closed by a member responsive to the delivery from the main pump.

Referring now to the accompanying drawing, which is very diagrammatic, we show at 12 a constant-pressure pump. At 19, 19a, we show two metering pumps also of a kind known per se, of which that marked 19 is adapted to deliver metered lubricant along a pipe 20 to a bearing or other point which is to be lubricated. (In practice there will be a battery of similar pumps 19, each supplied from the main pump 12, which deliver along lines 20 to different points.) The other pump 19a delivers along a pipe 21,

2 through a mechanism hereinafter to be described, to a pipe 22 leading to a bearing of a governor or some other part of the apparatus for which an extra supply of lubricant is not necessary. Alternatively, if an extra supply of lubricant should be necessary therefor, the pipe indicated by the chain lines 23 may be provided.

25 represents a control valve in the form of a piston operating within a cylinder and having an interior passage 26 which, in the position of the piston shown, interconnects a pipe 27 with a pipe 28 to supply lubricant, delivered by the main pump 12 along a pipe 29, to the pipe 20 for initial supply purposes. As will be understood, the associated metering pump 19 may deliver, say, only a few drops of lubricant each minute, in which case there would be material delay before the pipe 20, if of any reasonable length, were fully charged, which accounts for the need for an initial supply.

It is important, however, that the extra initial supply of lubricant should be discontinued after a predetermined interval (of, say, half a minute) dependent upon the delivery of the metering pump 19a and the length of the pipe 20. In the present instance, the pipe 21 leads to the upper end of a stationary cylinder 31 in which is mounted a servo valve in the form of a piston 32 pressed upwardly by a spring 33 to the position shown. Thus, when the apparatus is starting up, lubricant is delivered along the pipe 21 from the metering pump 19a to force the piston 32 downwardly against the pressure of the spring 33 until the metered lubricant delivered along the pipe 21 can enter the inlet to the pipe 22. When the piston 32 has moved in this way, i. e., after a time-lag dependent upon the delivery of the metering pump 19a and the area of the piston 32, the grooved portion 34 of the piston interconnects a pipe 35 (receiving the delivery from the main pump 12) and a pipe 36 leading to one end of the cylinder 37 for the piston 25, thereby forcing the piston 25 to the right against the return pressure of the spring 38 and cutting off the extra initial supply along the pipe 28 (and along the pipe 23 if used). Any leakage of liquid to the right-hand end of the cylinder 37 can escape along the drain 39.

Once the piston 25 has been moved fully to the right the pressure of the delivery pump 12 is applied along the pipe 27 to the left-hand end of the cylinder 37 to maintain the piston 25 in this position. This is of importance in case a leak should develop in the pipe 21, in which case the piston 32 might be returned to its raised position, as shown, by the spring 33 to cut off the supply of lubricant from the main pump 12 along the pipes 35 and 36. In these conditions the connection 36 is almost, but not quite, screened by the piston 32. The slight leak resulting will not be sufficient to materially reduce the pressure in the pipes 27 and 36 and at the left-hand end of the cylinder 37, so that the piston 25 will be maintained operated by the pressure.

On the other hand, when the apparatus is shut down it is necessary that the control valve 25 should return to the left-hand position shown in the drawing, to enable it to do which the piston 32 must be allowed to rise under the pressure of the spring 33, when the lubricant in the left-hand end of the cylinder 37 can drain away along the pipe 36 to the outlet 41. We therefore associate with the pipe 21 a leak-off means, including a ball valve 42 and a drain 43, and associate with the ball valve a diaphragm 44 to the appropriate side of which the pressure of the main pump 12, when working, is applied along a pipe 45—i. e., to close the ball valve. When the main pump 12 ceases to work, however, the diaphragm 44 no longer applies pressure to the ball valve 42 and the upper portion of the pipe 21 can therefore empty itself of lubricant whilst the plunger 32 is rising.

If liquid were to leak from the pipe 35 along the surface of the plunger 32 to the head thereof during starting up, the time-lag before the priming valve 25 were operated to close the short-circuit round the metering pump 19 would be varied, and to prevent the possibility of this we groove the surface of the piston 32, as shown at 47, and connect this groove by one or more radial bores 48 with an axial bore 49 leading to the lower end of the piston 32, so that any leakage can leave by the drain 41.

In this way we can ensure a sufficient supply of lubricant when starting up, and when running conditions are reached we can ensure exact lubrication independently of varying viscosity.

What we claim as our invention and desire to secure by Letters Patent of the United States is:

1. A lubrication system including a main constant-pressure pump, a metering pump interposed between the main pump and a point to be lubricated, means by which the metering pump is by-passed when starting up, and means for automatically closing the by-pass after a predetermined time-lag.

2. A lubrication system including a main constant-pressure pump, at least two metering pumps interposed between the main pump and different points, respectively, to be lubricated, a control valve including a movable piston biassed to an open position in which one of the metering pumps is by-passed to allow of the main pump to deliver lubricant directly to the point to be lubricated associated with the said one metering pump, a servo valve including a piston operable by the delivery from the other metering pump after a predetermined time-lag, the servo valve being biassed to a closed position and being in circuit with the delivery of the main pump and the piston of the control valve to effect the closure of said by-pass after the predetermined time-lag, and means responsive to the pressure of the main pump delivery acting to provide a leak in the delivery from the said other metering pump to allow, when the pressure of the main pump delivery falls below a predetermined value, the servo valve to return to the closed position and thereby the control valve to the open position.

3. A lubrication system, according to claim 2, in which the piston of the control valve is held in the actuated position (when actuated) by having the delivery of the main pump applied to its appropriate face.

4. A lubrication system, according to claim 2, in which said means includes a leak-off valve which is arranged to be closed by a member responsive to the delivery from the main pump.

5. A pressure lubrication system including a main constant pressure pump, at least two metering pumps supplied in parallel thereby, a control valve having a piston biassed towards one end of a cylinder to a position in which a by-pass is provided by the valve round one of the metering pumps, a servo valve including a piston biassed towards one end of a cylinder, another of the metering pumps being connected to deliver to said one end of the cylinder of the servo valve, a connection from the appropriate end of the control valve cylinder to the cylinder of the servo valve, a connection from the main pump to the cylinder of the servo valve, said connections being screened from one another by the servo valve piston when in the position to which it is biassed and being uncovered thereby to allow delivery of lubricant from the main pump through the servo valve when the servo valve has been actuated after a time-lag dependently upon the delivery from said other metering pump and upon the cross-section of the servo valve piston, and means for providing a leak in the delivery from the said other metering pump to the servo valve cylinder when the main pump is stopped.

6. A lubrication system, according to claim 5, in which the servo valve piston is peripherally grooved near the operative face, the groove communicating interiorly of the piston with the end thereof remote from the said one end, and a drain at the adjacent end of the servo valve cylinder.

THOMAS CLARK.
EDWARD VICTOR WINDSOR.
LAURENCE HART.